United States Patent
Zwartjes et al.

(10) Patent No.: US 12,032,111 B2
(45) Date of Patent: Jul. 9, 2024

(54) METHOD AND SYSTEM FOR FASTER SEISMIC IMAGING USING MACHINE LEARNING

(71) Applicant: SAUDI ARABIAN OIL COMPANY, Dhahran (SA)

(72) Inventors: Paul M. Zwartjes, Delft (NL); Rob Hegge, Delft (NL); Roald Van Borselen, Delft (NL)

(73) Assignee: SAUDI ARABIAN OIL COMPANY, Dhahran (SA)

(*) Notice: Subject to any disclaimer, the term of this patent is extended or adjusted under 35 U.S.C. 154(b) by 87 days.

(21) Appl. No.: 17/194,106

(22) Filed: Mar. 5, 2021

(65) Prior Publication Data

US 2022/0283329 A1    Sep. 8, 2022

(51) Int. Cl.
    *G01V 1/34*        (2006.01)
    *G01V 1/02*        (2006.01)
    (Continued)

(52) U.S. Cl.
CPC ............... *G01V 1/345* (2013.01); *G01V 1/02* (2013.01); *G01V 1/16* (2013.01); *G01V 1/282* (2013.01);
(Continued)

(58) Field of Classification Search
CPC . G01V 1/345; G01V 1/02; G01V 1/16; G01V 1/282; G01V 2210/121;
(Continued)

(56) References Cited

U.S. PATENT DOCUMENTS

| | | |
|---|---|---|
| 8,983,779 B2 | 3/2015 | Liu et al. |
| 9,702,997 B2 | 7/2017 | Sava et al. |

(Continued)

FOREIGN PATENT DOCUMENTS

| | | | |
|---|---|---|---|
| BR | 112021011247 A2 * | 9/2021 | ............... G01V 1/28 |
| KR | 102142403 B1 | 8/2020 | |

(Continued)

OTHER PUBLICATIONS

A. Adler and et al., "Deep Learning for Seismic Inverse Problems Towards the acceleration of geophysical analysis workflows", IEEE Signal Processing Magazine | Mar. 2021, Date of current version: Feb. 24, 2021, Date of Publication: Feb. 25, 2021 (Year: 2021).*
(Continued)

*Primary Examiner* — Douglas Kay
(74) *Attorney, Agent, or Firm* — Osha Bergman Watanabe & Burton LLP

(57) ABSTRACT

A method may include obtaining seismic data regarding a geological region of interest. The seismic data may include various pre-processed gathers. The method may further include obtaining a machine-learning model that is pre-trained to predict migrated seismic data. The method may further include selecting various training gathers based on a portion of the pre-processed gathers, a migration function, and a velocity model. The method may further include generating a trained model using the training gathers, the machine-learning model, and a machine-learning algorithm. The method may further include generating a seismic image of the geological region of interest using the trained model and a remaining portion of the seismic data.

9 Claims, 8 Drawing Sheets

(51) Int. Cl.
    *G01V 1/16*    (2006.01)
    *G01V 1/28*    (2006.01)
    *G06N 3/08*    (2023.01)

(52) U.S. Cl.
    CPC ......... *G06N 3/08* (2013.01); *G01V 2210/121* (2013.01); *G01V 2210/1295* (2013.01); *G01V 2210/1425* (2013.01); *G01V 2210/324* (2013.01); *G01V 2210/74* (2013.01)

(58) Field of Classification Search
    CPC ... G01V 2210/1295; G01V 2210/1425; G01V 2210/324; G01V 2210/74
    See application file for complete search history.

(56) References Cited

U.S. PATENT DOCUMENTS

| | | | | |
|---|---|---|---|---|
| 11,360,224 | B2* | 6/2022 | Tan | G01V 1/282 |
| 2013/0301387 | A1* | 11/2013 | van Groenestijn | G01V 1/36 367/46 |
| 2015/0185342 | A1 | 7/2015 | van Groenestijn | |
| 2016/0131781 | A1* | 5/2016 | Sun | G01V 1/282 367/7 |
| 2016/0320512 | A1 | 11/2016 | Zhao et al. | |
| 2017/0299745 | A1* | 10/2017 | Kim | G01V 1/286 |
| 2018/0120464 | A1* | 5/2018 | Sun | G01V 1/282 |
| 2018/0292554 | A1* | 10/2018 | Zhang | G01V 1/32 |
| 2018/0336464 | A1 | 11/2018 | Karras et al. | |
| 2019/0064389 | A1 | 2/2019 | Denli et al. | |
| 2019/0122108 | A1 | 4/2019 | Kliegl et al. | |
| 2019/0302290 | A1 | 10/2019 | Alwon | |
| 2019/0324167 | A1 | 10/2019 | Zhang | |
| 2019/0383965 | A1* | 12/2019 | Salman | G01V 11/00 |
| 2020/0183031 | A1 | 6/2020 | Denli et al. | |
| 2020/0184374 | A1* | 6/2020 | Liu | G06N 20/00 |
| 2020/0264327 | A1 | 8/2020 | Gadylshin et al. | |
| 2020/0301036 | A1 | 9/2020 | Ramfjord et al. | |
| 2020/0379135 | A1 | 12/2020 | Hou et al. | |
| 2021/0123334 | A1 | 4/2021 | Madasu et al. | |
| 2021/0133539 | A1 | 5/2021 | Srivastava et al. | |
| 2021/0326721 | A1* | 10/2021 | Zhang | G06N 3/084 |
| 2021/0372258 | A1 | 12/2021 | Kazemi Nojadeh et al. | |
| 2021/0405236 | A1* | 12/2021 | Wang | G01V 1/362 |
| 2022/0237891 | A1* | 7/2022 | Xu | G01V 3/02 |
| 2023/0093005 | A1* | 3/2023 | Lowell | G06N 3/045 |
| 2023/0105422 | A1 | 4/2023 | Pickles et al. | |

FOREIGN PATENT DOCUMENTS

| | | |
|---|---|---|
| WO | 2019/067960 A1 | 4/2019 |
| WO | 2020252419 A1 | 12/2020 |
| WO | 2022/204682 A1 | 9/2022 |
| WO | 2022/207573 A1 | 10/2022 |

OTHER PUBLICATIONS

Yang, Fangshu, and Jianwei Ma. "Deep-learning inversion: A next-generation seismic velocity model building method." Geophysics 84, No. 4 (2019): R583-R599 (Year: 2019).*

Knibbe, H. et al.; "Closing the performance gap between an iterative frequency-domain solver and an explicit time-domain scheme for 3D migration on parallel architectures;" Geophysics; vol. 79, No. 2; Mar.-Apr. 2014; pp. S47-S61 (15 pages).

Liu, Wei et al., "Accelerating High-Resolution Seismic Imaging by Using Deep Learning"; MDPI Open Access Journals: Applied Sciences; vol. 10, Issue 7, Article 2502; pp. 1-16; Apr. 5, 2020 (16 pages).

Calderón-Macías, Carlos et al., "Artificial neural networks for parameter estimation in geophysics"; Geophysical Prospecting; vol. 48, Issue 1; pp. 21-47; Dec. 24, 2001 (27 pages).

Biswas, Reetam et al., "Estimating normal moveout velocity using the recurrent neural network"; Interpretation; vol. 7, Issue 4; pp. T819-T827; Nov. 2019 (9 pages).

International Search Report and Written Opinion of the International Searching Authority issued is corresponding International Application No. PCT/US2022/018995, mailed Jun. 2, 2022 (12 pages).

Bougher, Benjamin Bryan, "Machine learning applications to geophysical data analysis"; A thesis submitted in partial fulfillment of the requirements for the degree of Master of Science in the Faculty of Graduate and Postdoctoral Studies; The University of British Columbia; pp. ii-73; Aug. 2016 (86 pages).

Non-Final Office Action issued in corresponding U.S. Appl. No. 17/452,709, mailed Nov. 2, 2023 (29 pages).

Non-Final Office Action issued in corresponding U.S. Appl. No. 17/452,709, mailed Jun. 8, 2023 (48 pages).

* cited by examiner

METHOD AND SYSTEM FOR FASTER SEISMIC IMAGING USING MACHINE LEARNING

BACKGROUND

By performing a complete migration-wavefield inversion, a migration algorithm may convert time-based seismic data into a depth representation of a subsurface. In particular, a migration algorithm may use a velocity model that represents different particle velocity values within the subsurface to determine image data from data in a data domain. However, migration algorithms may be computational intensive processes due to the required number of calculations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, seismic data regarding a geological region of interest. The seismic data includes various pre-processed gathers. The method further includes obtaining, by the computer processor, a machine-learning model that is pre-trained to predict migrated seismic data. The method further includes selecting, by the computer processor, various training gathers based on a portion of the pre-processed gathers, a migration function, and a velocity model. The method further includes generating, by the computer processor, a trained model using the training gathers, the machine-learning model, and a machine-learning algorithm. The method further includes generating, by the computer processor, a seismic image of the geological region of interest using the trained model and a remaining portion of the seismic data.

In general, in one aspect, embodiments relate to a non-transitory computer readable medium storing instructions executable by a computer processor. The instructions obtain seismic data regarding a geological region of interest. The seismic data include various pre-processed gathers. The instructions further obtain a machine-learning model that is pre-trained to predict migrated seismic data. The instructions further select various training gathers based on a portion of the pre-processed gathers, a migration function, and a velocity model. The instructions further generate a trained model using the training gathers, the machine-learning model, and a machine-learning algorithm. The instructions further generate a seismic image of the geological region of interest using the trained model and a remaining portion of the seismic data.

In general, in one aspect, embodiments relate to a system that include a seismic surveying system including a seismic source and various seismic receivers. The system further includes a seismic interpreter that includes a computer processor. The seismic interpreter is coupled to the seismic surveying system. The seismic interpreter obtains, using the seismic surveying system, seismic data regarding a geological region of interest. The seismic data include various pre-processed gathers. The seismic interpreter further obtains a machine-learning model that is pre-trained to predict migrated seismic data. The seismic interpreter further selects various training gathers based on a portion of the pre-processed shot gathers, a migration function, and a velocity model. The seismic interpreter further generates a trained model using the training gathers, the machine-learning model, and a machine-learning algorithm. The seismic interpreter generates a seismic image of the geological region of interest using the trained model and a remaining portion of the seismic data.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
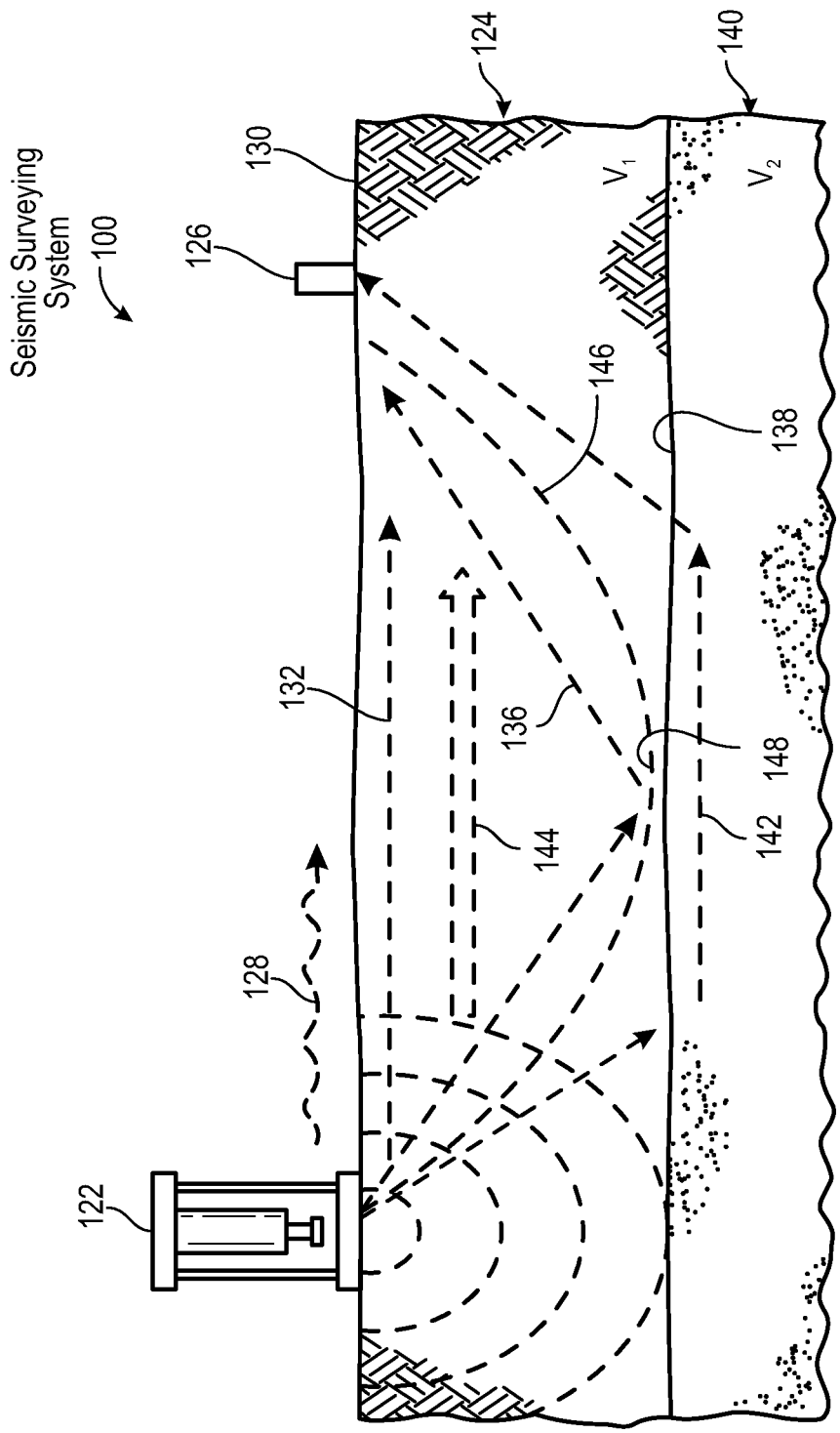
FIGS. 1 and 2 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using machine learning to determine migrated image data from seismic data. In particularly, some embodiments include dividing a seismic dataset into a set of pre-processed gathers that undergo reverse time migration using computationally-intensive migration algorithms. For example, seismic data may be grouped within one or more seismic gathers according to various spatial coordinates, such as according to a common shot, a common receiver, a common midpoint, or a common offset. Likewise, the seismic dataset also includes a larger set of pre-processed gathers that are used as an input to a trained machine-learning model that approximates the computations performed by the migration algorithms. To train the machine-learning model, the smaller seismic gather set may be used to produce a set of training gathers that are used as training data and testing data. Once all of the pre-processed gathers have been migrated, a final stacked image may be generated for a geological region of interest.

In some embodiments, this machine-learning model is a neural network that has been pre-trained to predict migrated image data. To train a neural network, its architecture is first selected, e.g., in order to serve as a convolutional neural network (CNN), U-net model, a recurrent neural network, etc. The neural network may include network parameters that are initialized as random numbers, where the parameters may be updated/improved via "training." Examples of training operations may include performing gradient descent methods that minimize a cost function defined using a misfit between predicted and actual outcomes. In the context of a "pre-trained" network, the network parameters are not random. For instance, a pre-trained network may have network parameters that were determined in a previous round of training (i.e., not random values), using another seismic survey. Thus, the actual outcome may be a migrated gather generated using a particular migration operator (e.g., reverse time migration). On the other hand, the predicted outcome may be the result of various operations performed by the neural network to an input gather.

By using machine learning to approximate migration techniques, some embodiments may lower the computational effort (and, thus the cost of seismic imaging) for generating a stacked seismic image. Accordingly, this computational reduction from migration algorithms may result in more seismic imaging during a seismic processing workflow.

Turning to FIG. 1, FIG. 1 shows a schematic diagram in accordance with one or more embodiments. As shown in FIG. 1, FIG. 1 illustrates a seismic surveying system (100) and various resultant paths of pressure waves (also called seismic waves). The seismic surveying system (100) includes a seismic source (122) that includes functionality for generating pressure waves, such as a reflected wave (136), diving wave A (142), or diving wave B (146), through a subsurface layer (124). Pressure waves generated by the seismic source (122) may travel along several paths through a subsurface layer (124) at a particle velocity $V_1$ for detection at a number of seismic receivers (126) along the line of profile. Likewise, particle velocity may refer to multiple velocities types, such as the two types of particle motions resulting from a seismic wave, i.e., velocity of the primary wave (P-wave) and a different velocity of the secondary wave (S-wave) through a particular medium. The seismic source (122) may be a seismic vibrator, such as one that uses a vibroseis technique, an air gun in the case of offshore seismic surveying, explosives, etc. The seismic receivers (126) may include geophones, hydrophones, accelerometers, and other sensing devices. Likewise, seismic receivers (126) may include single component sensors and/or multi-component sensors that measure pressure waves in multiple spatial axes.

As shown in FIG. 1, the seismic source (122) generates an air wave (128) formed by a portion of the emitted seismic energy, which travels above the earth's surface (130) to the seismic receivers (126). The seismic source (122) may also emit surface waves (132), which travel along the earth's surface (130). The speed of the surface waves (132), also called Rayleigh waves or ground roll, may correspond to a particle velocity typically slower than the velocity of a secondary wave. While the seismic surveying shown in FIG. 1 is a two-dimensional survey along a seismic profile along a longitudinal direction, other embodiments are contemplated, such as three-dimensional surveys.

Furthermore, subsurface layer (124) has a particle velocity $V_1$, while subsurface layer (140) has a particle velocity $V_2$. In words, different subsurface layers may correspond to different particle velocity values. In particular, a particle velocity may refer to the speed that a pressure wave travels through a medium, e.g., diving wave B (146) that makes a curvilinear ray path (148) through subsurface layer (124). Particle velocity may depend on a particular medium's density and elasticity as well as various wave properties, such as the frequency of an emitted pressure wave. Where a particle velocity differs between two subsurface layers, this seismic impedance mismatch may result in a seismic reflection of a pressure wave. For example, FIG. 1 shows a pressure wave transmitted downwardly from the seismic source (122) to a subsurface interface (138), which becomes a reflected wave (136) transmitted upwardly in response to the seismic reflection. The seismic source (122) may also generate a direct wave (144) that travels directly from the seismic source (122) at the particle velocity $V_1$ through the subsurface layer (124) to the seismic receivers (126).

Turning to refracted pressure waves, the seismic source (122) may also generate a refracted wave (i.e., diving wave A (142)) that is refracted at the subsurface interface (138) and travels along the subsurface interface (138) for some distance as shown in FIG. 1 until traveling upwardly to the seismic receivers (126). As such, refracted pressure waves may include diving waves (e.g., diving wave A (142), diving wave B (146)) that may be analyzed to map the subsurface layers (124, 140). For example, a diving wave may be a type of refracted wave that is continuously refracted throughout an earth's subsurface. Thus, a diving wave may be generated where particle velocities are gradually increasing with depth at a gradient. Likewise, the apex of a diving wave may be offset from a common midpoint (CMP) in contrast to reflected seismic energy. Though, for analysis purposes, an apex of a diving wave may be regarded as a common midpoint for the refracted energy. As such, the apex may serve as the basis for organizing and sorting a seismic survey dataset.

Furthermore, in analyzing seismic data acquired using the seismic surveying system (100), seismic wave propagation may be approximated using rays. For example, reflected waves (e.g., reflected wave (136)) and diving waves (e.g., diving waves (142, 146)) may be scattered at the subsurface interface (138). In FIG. 1, for example, the diving wave B (146) may exhibit a ray path of a wide angle that resembles a reflected wave in order to map the subsurface. Using diving waves, for example, a velocity model for an underlying subsurface may be generated that describes the particle velocity of different regions in different subsurface layers. An initial velocity model may be generated by modeling the velocity structure of media in the subsurface using an inversion of seismic data, typically referred to as seismic inversion. In seismic inversion, a velocity model is iteratively updated until the velocity model and the seismic data have a minimal amount of mismatch, e.g., the solution of the velocity model converges to a global optimum that satisfies a predetermined criterion.

With respect to velocity models, a velocity model may map various subsurface layers based on particle velocities in different layer sub-regions (e.g., P-wave velocity, S-wave velocity, and various anisotropic effects in the sub-region). For example, a velocity model may be used with P-wave and S-wave arrival times and arrival directions to locate seismic events. Anisotropy effects may correspond to subsurface properties that cause pressure waves to be directionally dependent. Thus, seismic anisotropy may correspond to various parameters in geophysics that refers to variations of wave velocities based on direction of propagation. One or more anisotropic algorithms may be performed to determine anisotropic effects, such as an anisotropic ray-tracing location algorithm or algorithms that use deviated-well sonic logs, vertical seismic profiles (VSPs), and core measurements. Likewise, a velocity model may include various velocity boundaries that define regions where rock types changes, such as interfaces between different subsurface layers. In some embodiments, a velocity model is updated using one or more tomographic updates to adjust the velocity boundaries in the velocity model.

Figure 2:
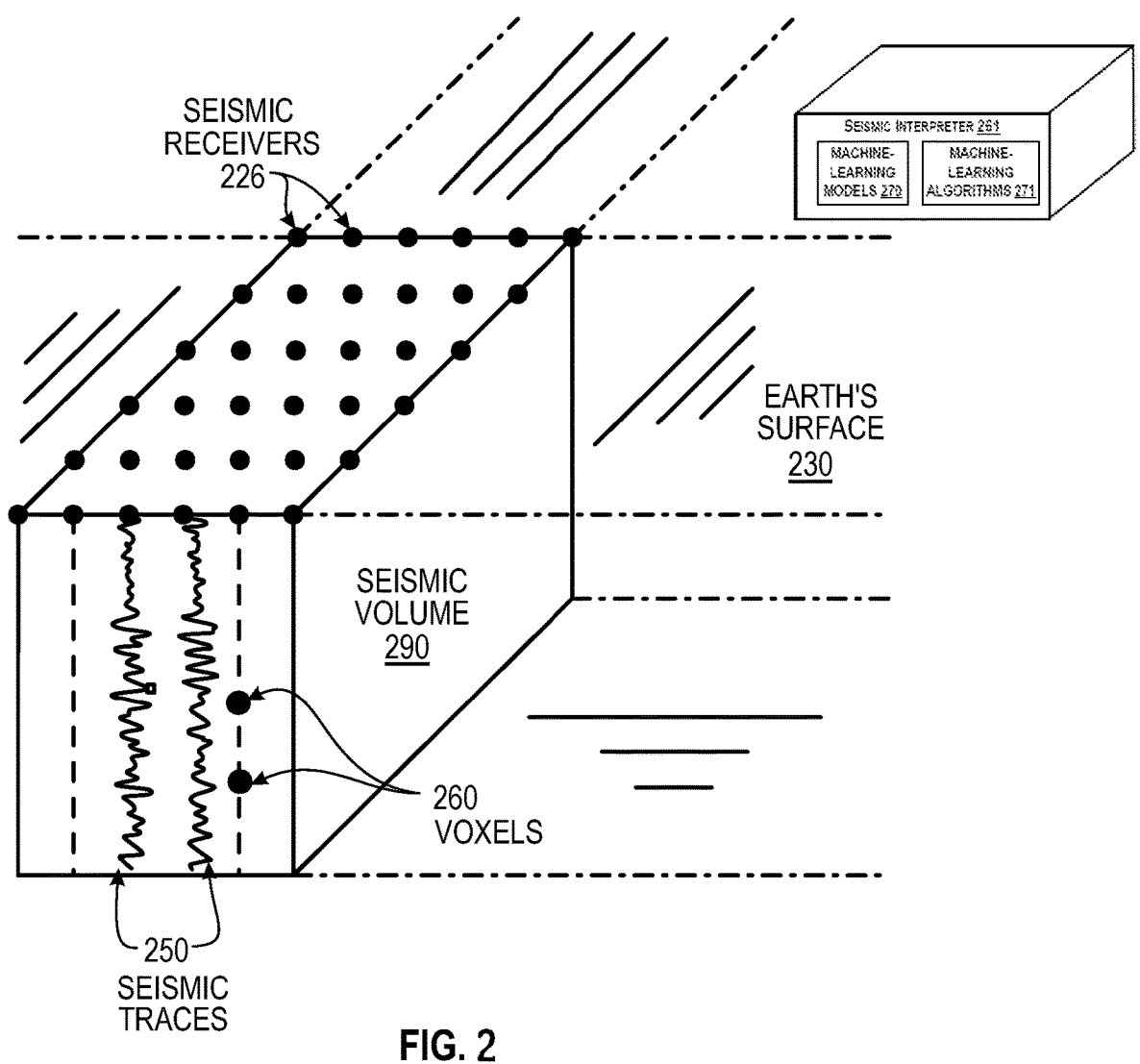

Turning to FIG. 2, FIG. 2 illustrates a system in accordance with one or more embodiments. As shown in FIG. 2, a seismic volume (290) is illustrated that includes various seismic traces (e.g., seismic traces (250)) acquired by various seismic receivers (e.g., seismic receivers (226)) disposed on the earth's surface (230). More specifically, a seismic volume (290) may be a three-dimensional cubic dataset of seismic traces. Individual cubic cells within the seismic volume (290) may be referred to as voxels or volumetric pixels (e.g., voxels (260)). In particular, different portions of a seismic trace may correspond to various depth points within a volume of earth. To generate the seismic volume (290), a three-dimensional array of seismic receivers (226) are disposed along the earth's surface (230) and acquire seismic data in response to various pressure waves emitted by seismic sources. Within the voxels (260), statistics may be calculated on first break data that is assigned to a particular voxel to determine multimodal distributions of wave travel times and derive travel time estimates (e.g., according to mean, median, mode, standard deviation, kurtosis, and other suitable statistical accuracy analytical measures) related to azimuthal sectors. First break data may describe the onset arrival of refracted waves or diving waves at the seismic receivers (226) as produced by a particular seismic source signal generation.

Seismic data may refer to raw time domain data acquired from a seismic survey (e.g., acquired seismic data may result in the seismic volume (290)). However, seismic data may also refer to data acquired over different periods of time, such as in cases where seismic surveys are repeated to obtain time-lapse data. Seismic data may also refer to various seismic attributes derived in response to processing acquired seismic data. Furthermore, in some contexts, seismic data may also refer to depth data or image data. Likewise, seismic data may also refer to processed data, e.g., using a seismic inversion operation, to generate a velocity model of a subterranean formation, or a migrated seismic image of a rock formation within the earth's surface. Seismic data may also be pre-processed data, e.g., arranging time domain data within a two-dimensional shot gather.

Furthermore, seismic data may include various spatial coordinates, such as (x,y) coordinates for individual shots and (x,y) coordinates for individual receivers. As such, seismic data may be grouped into common shot or common receiver gathers. In some embodiments, seismic data is grouped based on a common domain, such as common midpoint (i.e., Xmidpoint=(Xshot+Xrec)/2, where Xshot corresponds to a position of a shot point and Xrec corresponds to a position of a seismic receiver) and common offset (i.e., Xoffset=Xshot−Xrec).

In some embodiments, seismic data is processed to generate one or more seismic images. For example, seismic imaging may be performed using a process called migration. In some embodiments, migration may transform pre-processed shot gathers from a data domain to an image domain that corresponds to depth data. In the data domain, seismic events in a shot gather may represent seismic events in the subsurface that were recorded in a field survey. In the image domain, seismic events in a migrated shot gather may represent geological interfaces in the subsurface. Likewise, various types of migration algorithms may be used in seismic imaging. For example, one type of migration algorithm corresponds to reverse time migration. In reverse time migration, seismic gathers may be analyzed by: 1) forward modelling of a seismic wavefield via mathematical modelling starting with a synthetic seismic source wavelet and a velocity model; 2) backward propagating the seismic data via mathematical modelling using the same velocity model; 3) cross-correlating the seismic wavefield based on the results of forward modeling and backward propagating; and 4) applying an imaging condition during the cross-correlation to generate a seismic image at each time step. The imaging condition may determine how to form an actual image by estimating cross-correlation between the source wavefield with the receiver wavefield under the basic assumption that the source wavefield represents the down-going wave-field and the receiver wave-field the up-going wave-field. In Kirchhoff and beam methods, for example, the imaging condition may include a summation of contributions resulting from the input data traces after the traces have been spread along portions of various isochrones (e.g., using principles of constructive and destructive interference to form the image).

Keeping with seismic imaging, seismic imaging may be near the end of a seismic data workflow before an analysis by a seismic interpreter. The seismic interpreter may subsequently derive understanding of the subsurface geology from one or more final migrated images. In order to confirm whether a particular seismic data workflow accurately models the subsurface, a normal moveout (NMO) stack may be generated that includes multiple NMO gathers with amplitudes sampled from a common midpoint (CMP). In particular, a NMO correction may be a seismic imaging approximation based on calculating reflection travel times. However, NMO-stack results may not indicate an accurate subsurface geology, where the subsurface geology is complex with large heterogeneities in particle velocities or when a seismic survey is not acquired on a horizontal plane. Ocean-Bottom-Node surveys and rough topographic land seismic surveys may be examples where NMO-stack results fail to depict subsurface geologies.

While seismic traces with zero offset are generally illustrated in FIG. 2, seismic traces may be stacked, migrated and/or used to generate an attribute volume derived from the underlying seismic traces. For example, an attribute volume may be a dataset where the seismic volume undergoes one or more processing techniques, such as amplitude-versus-offset (AVO) processing. In AVO processing, seismic data may be classified based on reflected amplitude variations due to the presence of hydrocarbon accumulations in a subsurface formation. With an AVO approach, seismic attributes of a subsurface interface may be determined from the dependence of the detected amplitude of seismic reflections on the angle of incidence of the seismic energy. This AVO processing may determine both a normal incidence coefficient of a seismic reflection, and/or a gradient component of the seismic reflection. Likewise, seismic data may be processed according to a pressure wave's apex. In particular, the apex may serve as a data gather point to sort first break picks for seismic data records or traces into offset bins based on the survey dimensional data (e.g., the x-y locations of the seismic receivers (226) on the earth surface (230)). The bins may include different numbers of traces and/or different coordinate dimensions.

Turning to the seismic interpreter (261), a seismic interpreter (261) may include hardware and/or software with functionality for storing the seismic volume (290), well logs, core sample data, and other data for seismic data processing, well data processing, training operations, and other data processes accordingly. In some embodiments, the seismic interpreter (261) may include a computer system that is similar to the computer (602) described below with regard to FIG. 6 and the accompanying description. While a seismic interpreter may refer to one or more computer systems that are used for performing seismic data processing, the seismic interpreter may also refer to a human analyst performing seismic data processing in connection with a computer. While the seismic interpreter (261) is shown at a seismic surveying site, in some embodiments, the seismic interpreter (261) may be remote from a seismic surveying site.

Keeping with the seismic interpreter (261), seismic interpreter (261) may include hardware and/or software with functionality for generating one or more machine-learning models (270) for use in analyzing seismic data and one or more subsurface formations. For example, seismic interpreter (261) may use and/or process seismic data as well as other types of data to generate and/or update one or more machine-learning models (170) and/or one or more velocity models. Thus, different types of machine-learning models may be trained, such as convolutional neural networks, deep neural networks, recurrent neural networks, support vector machines, decision trees, inductive learning models, deductive learning models, supervised learning models, unsupervised learning models, reinforcement learning models, etc. In some embodiments, two or more different types of machine-learning models are integrated into a single machine-learning architecture, e.g., a machine-learning model may include decision trees and neural networks. In some embodiments, the seismic interpreter (261) may generate augmented or synthetic data to produce a large amount of interpreted data for training a particular model.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights and biases for adjusting the data inputs. These network weights and biases may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

In some embodiments, various types of machine learning algorithms (e.g., machine-learning algorithms (271)) may be used to train the model, such as a backpropagation algorithm. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the electronic model. In some embodiments, a machine-learning model is trained using multiple epochs. For example, an epoch may be an iteration of a model through a portion or all of a training dataset. As such, a single machine-learning epoch may correspond to a specific batch of training data, where the training data is divided into multiple batches for multiple epochs. Thus, a machine-learning model may be trained iteratively using epochs until the model achieves a predetermined level of prediction accuracy. Thus, better training of a model may lead to better predictions by a trained model.

Figure 3:
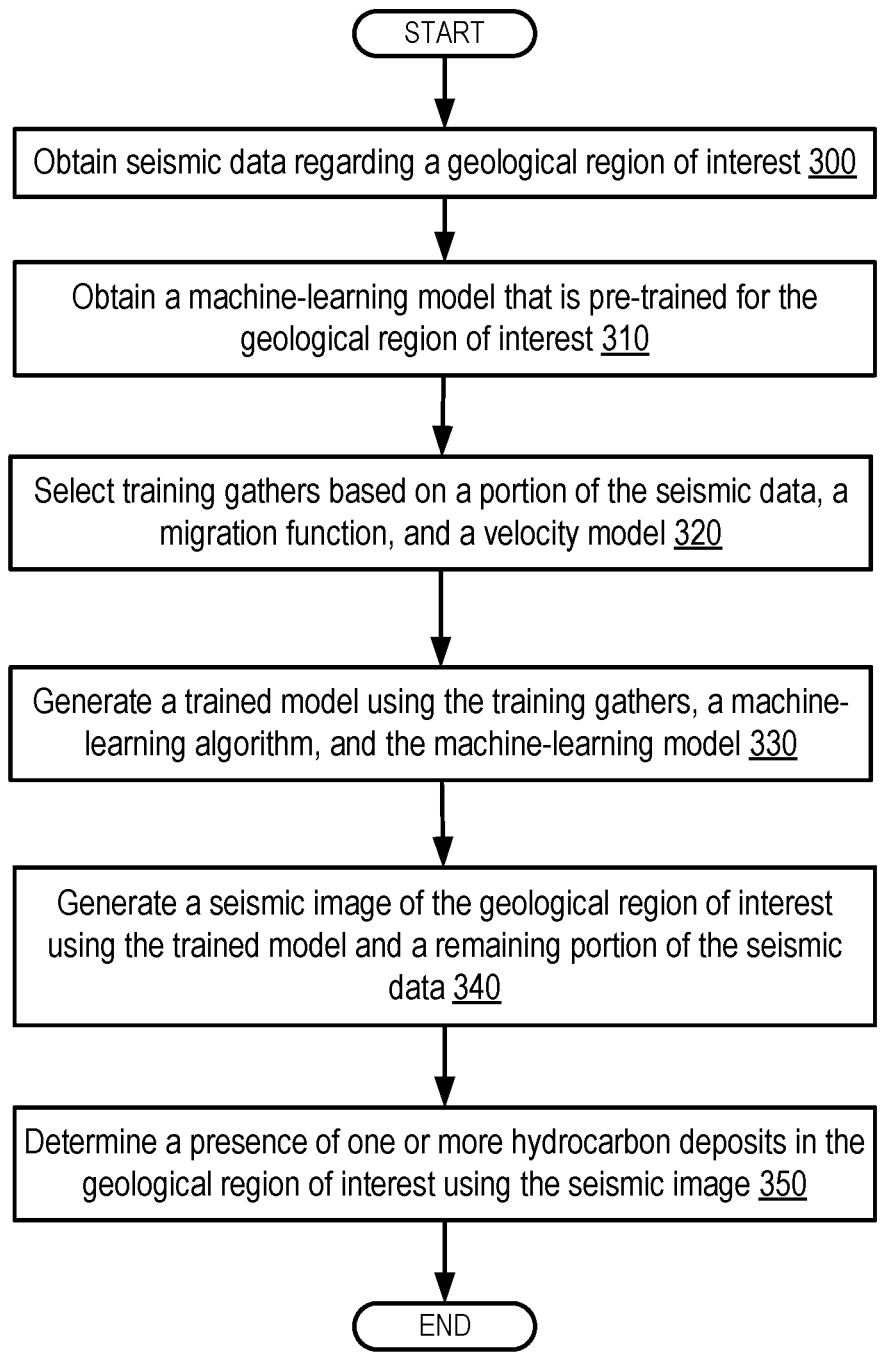
FIG. 3 shows a flowchart in accordance with one or more embodiments.

Turning to FIG. 3, FIG. 3 shows a flowchart in accordance with one or more embodiments. Specifically, FIG. 3 describes a general method for generating a seismic image using machine learning. One or more blocks in FIG. 3 may be performed by one or more components (e.g., seismic interpreter (261)) as described in FIGS. 1-2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, seismic data are obtained regarding a geological region of interest in accordance with one or more embodiments. A geological region of interest may be a portion of a geological area or volume that includes one or more formations of interest desired or selected for analysis, e.g., for determining location of hydrocarbons or reservoir development purposes. The seismic data may be similar to the seismic data described above in FIG. 2 and the accompanying description.

In some embodiments, the seismic data includes pre-processed gathers. For example, a pre-processed gather may include a collection of seismic traces made according to some trace header parameter. During pre-processing, unwanted noise, surface waves, and multiple reflections may be removed from the raw seismic data such that only primary reflections from subsurface layers may remain in the pre-processed data. In some embodiments, the pre-processed gather is a shot gather, a common receiver gather, a common midpoint gather, or a common offset gather.

After removing this noise, the seismic data may be further processed into a shot gather that includes various dimensions, such as distance from a seismic source along a horizontal axis, and a time value since the seismic source (i.e., the "shot") was triggered (i.e., depicted along a vertical axis). In other words, a shot gather may correspond to a two-dimensional plot, where one axis corresponds to distance from a seismic source and another axis corresponds to time. In some embodiments, a shot gather corresponds to a three dimensional dataset, where the vertical axis represents time and two horizontal axes represent location coordinates. Moreover, pre-processed shot gathers may be divided into a training shot gather set that provides training data and testing data for machine learning. The pre-processed shot gathers may also include a remaining portion that provides input data for the trained model. Based on this input data, the trained model may output one or more seismic images of the geological region of interest.

In Block 310, a machine-learning model is obtained for a geological region of interest in accordance with one or more embodiments. For example, an initial model may be obtained and initialized with weights and/or biases prior to a training operation. In particular, the machine learning model may be capable of approximating solutions of complex non-linear problems, such as a neural network or an artificial neural network. Various types of neural networks are contemplated, such as a fully connected network (FCN), a deep neural network with three or more hidden layers, a convolutional neural network, and various other types of neural networks, such as a U-Net model. For example, a convolutional neural network may include various convolutional layers, pooling layers, fully connected layers, and/or normalization layers to produce a particular type of output or outputs. For more information on machine-learning models such as neural networks, see FIG. 2 above and the accompanying description.

In some embodiments, the machine-learning model is pre-trained for the geological region of interest. For example, some training operations may benefit from "transfer learning" between models trained using similar problems with different training datasets. Thus, a pre-trained model may refer to a model that was trained on a large benchmark dataset to solve a similar problem, such as seismic imaging based on seismic gathers. Accordingly, different types of pre-training processes may be performed to prepare for an actual training operation. In some embodiments, a pre-training operation may train only a portion of the hidden layers in a machine-learning model without changing the remaining hidden layers. In particular, lower hidden layers may refer to general features (i.e., hidden layers independent of a particular velocity model or geological region), while higher layers may refer to specific features (i.e., hidden layers that dependent). In some embodiments, a machine-learning architecture is reused from a previous model in order to retrain a new model. In some embodiments, a model may be pre-trained using legacy seismic data before a seismic data processing workflow begins (e.g., using data from previous seismic processing operations).

With respect to seismic imaging, a trained model may be specific to a given velocity model. As such, a machine-learning model may require retraining in order to be used with a different velocity model. By training a neural network for a similar but different imaging problem, a model may be initialized with neural network weights and biases that require fewer updates to approximate a different geological region of interest or velocity model. Thus, transfer learning may reduce training time for the current geological region.

In Block 320, training gathers are selected based on a portion of seismic data, a migration function, and a velocity model in accordance with one or more embodiments. For example, a training gather may correspond to a pair of different gathers, i.e., an input gather and an output gather to the machine-learning model. The input gather may be an unmigrated gather and the output gather may be a migrated gather. After pre-processing the seismic data to produce various seismic gathers, time-based gathers are migrated using a migration function and a velocity model. The velocity model may correspond to the particle velocity with which pressure waves propagate through the geological region of interest. Thus, the velocity model may be obtained from velocity analysis on legacy seismic data or generated using a seismic inversion technique. Likewise, synthetic gathers may be used in place of recorded seismic data, because a model may not be able to learn the migration function based on raw seismic data alone. In other words, a machine-learning model may not be able generalize to an unseen velocity model or seismic data with very different characteristics (e.g., due to the presence of different kinds of noise in the data). For more information on velocity models, see FIGS. 1-2 above and the accompanying description.

Furthermore, synthetic or real gathers may provide a training dataset for training a machine-learning model. In particular, the training gathers may correspond to a predetermined percentage of seismic data in a specific dataset. Thus, the remaining portion of seismic gathers may be greater than the number of training gathers. During training, a time-based gather may provide input features to the machine-learning model, while the migrated gather may correspond to the predicted output of the model where the vertical axis is in time or depth. Thus, these training gathers may include an input-output pair for training the model in a particular epoch. Likewise, training gathers may also provide testing data for determining whether the accuracy of the machine-learning model satisfies a predetermined criterion (e.g., an accuracy level of 90%). In some embodiments, the training gathers are based on augmented data and/or synthetic data, e.g., to generate a sufficient number of training gathers without performing additional migration computations.

With respect to the migration function, the migration function may correspond to one or more migration algorithms. In some embodiments, the migration function uses reverse time migration or another method (such as a phase-shift-plus-interpolation (PSPI) method) with various cross correlation time lags. As such, the migration function may be based on one-way wave-equation tomography, ray tracing, or two-way wave-equation tomography. However, other migration algorithms are contemplated based on other data domains (e.g., common receiver, common midpoint, common offset, common azimuth, etc.).

In some embodiments, the input data of a migration function are seismic gathers which have a vertical axis in time (i.e., recording time of the seismic experiment). The horizontal axis or axes of the seismic gathers may denote spatial location. Thus, the process of migration uses a velocity model to transform the vertical axis from time to depth. However, the output of a migration function may also transform the vertical axis into time coordinates. With knowledge of the velocity model, the vertical axis may simply be stretched from time to depth and vice versa. One benefit of a migration function may be that it ensures the seismic reflection energy is repositioned into location information (i.e., horizontally and vertically) where a reflection took place in the subsurface.

In Block 330, a trained model is generated using various training gathers, a machine-learning algorithm, and a machine-learning model in accordance with one or more embodiments. In some embodiments, for example, a pre-trained neural network is re-trained to predict migrated gathers from the training gathers. The training operation may be performed using one or more types of machine-learning algorithms, such as a supervised algorithm. In supervised learning, the trained model may be generated using a gradient-based optimization (e.g., a stochastic gradient descent process) to update weights and biases within the model such that a misfit between predicted image data and actual image data (i.e., based on a migration algorithm) is minimized.

After completing the training operation, a seismic interpreter may use a trained neural network to predict migrated gathers from the remaining portion of the unmigrated gathers. Thus, the trained model may provide an approximation of various computationally intensive migration steps, such as forward modeling, backward wavefield propagation, cross-correlations, and/or imaging per seismic gather. For more information on training operations and machine-learning algorithms, see FIG. 2 above and the accompanying description.

In Block 340, a seismic image of a geological region of interest is generated using a trained model and a remaining portion of seismic data in accordance with one or more embodiments. For example, a set of migrated gathers may be summed or stacked to produce a final seismic image (e.g., the migrated gathers in Block 320 and predicted migrated gathers determined using a trained model). Using a trained model, the computational burden of seismic data migration may be shifted toward training operations rather than performing migration algorithms on individual seismic gathers. In some embodiments, the seismic image provides a spatial and depth illustration of a subsurface formation for various practical applications, such as predicting hydrocarbon deposits, predicting wellbore paths for geosteering, etc.

In Block 350, a presence of one or more hydrocarbon deposits is determined in a geological region of interest using a seismic image in accordance with one or more embodiments.

Figure 4A:
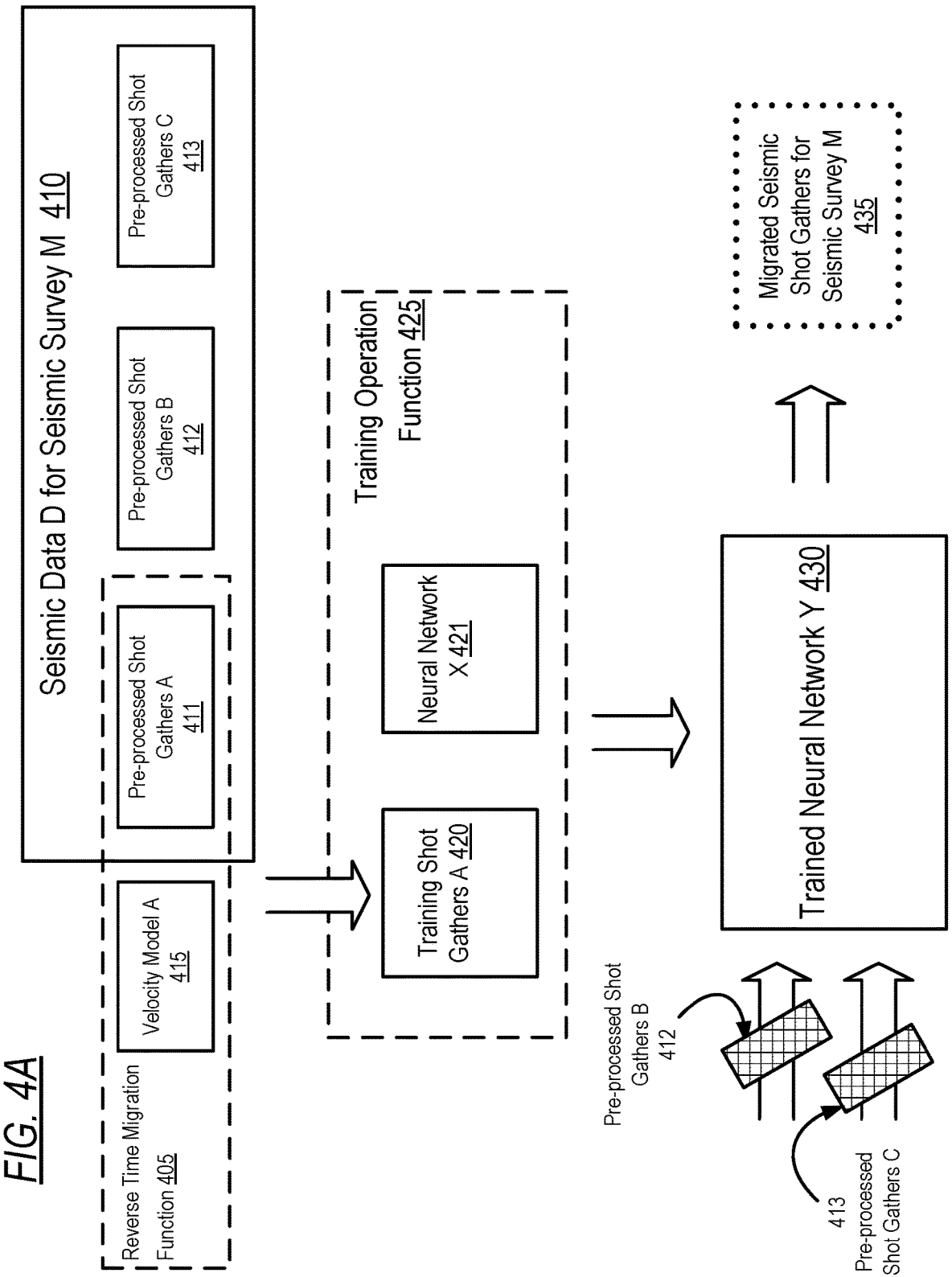
FIGS. 4A, 4B, 4C, 5A, and 5B show examples in accordance with one or more embodiments.
Figure 4B:
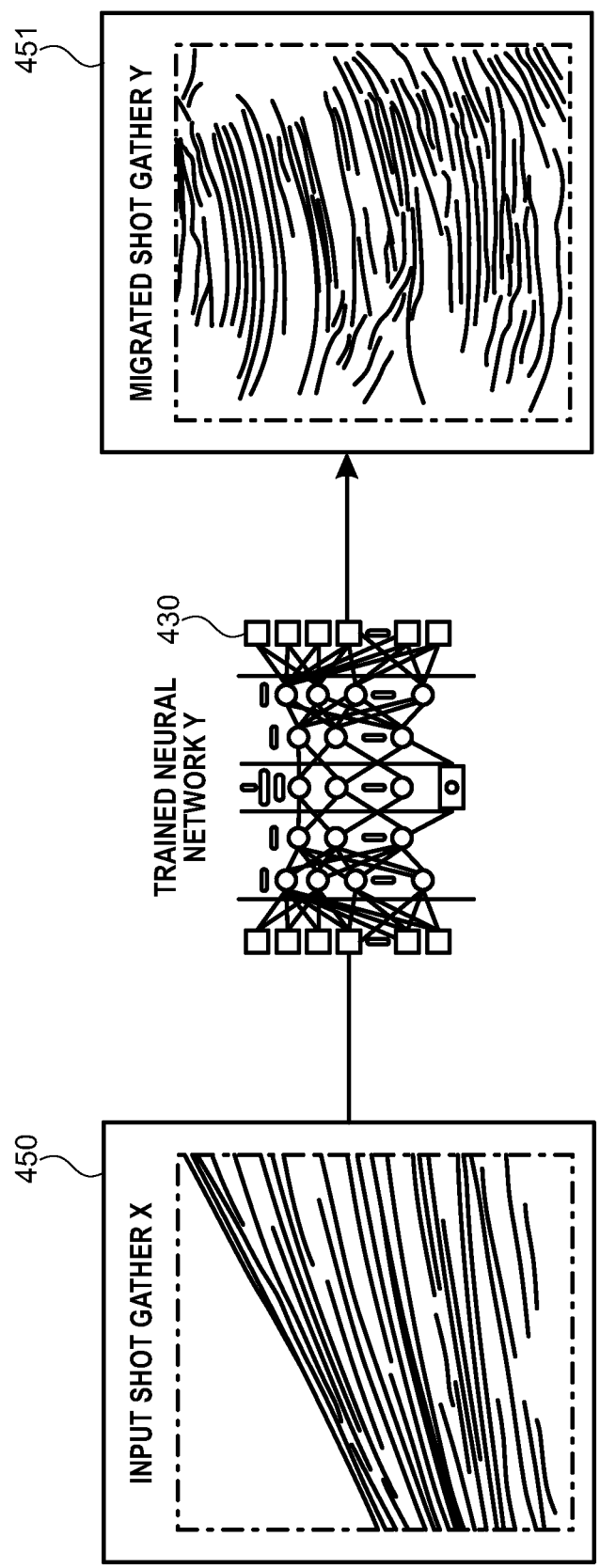
Figure 4C:
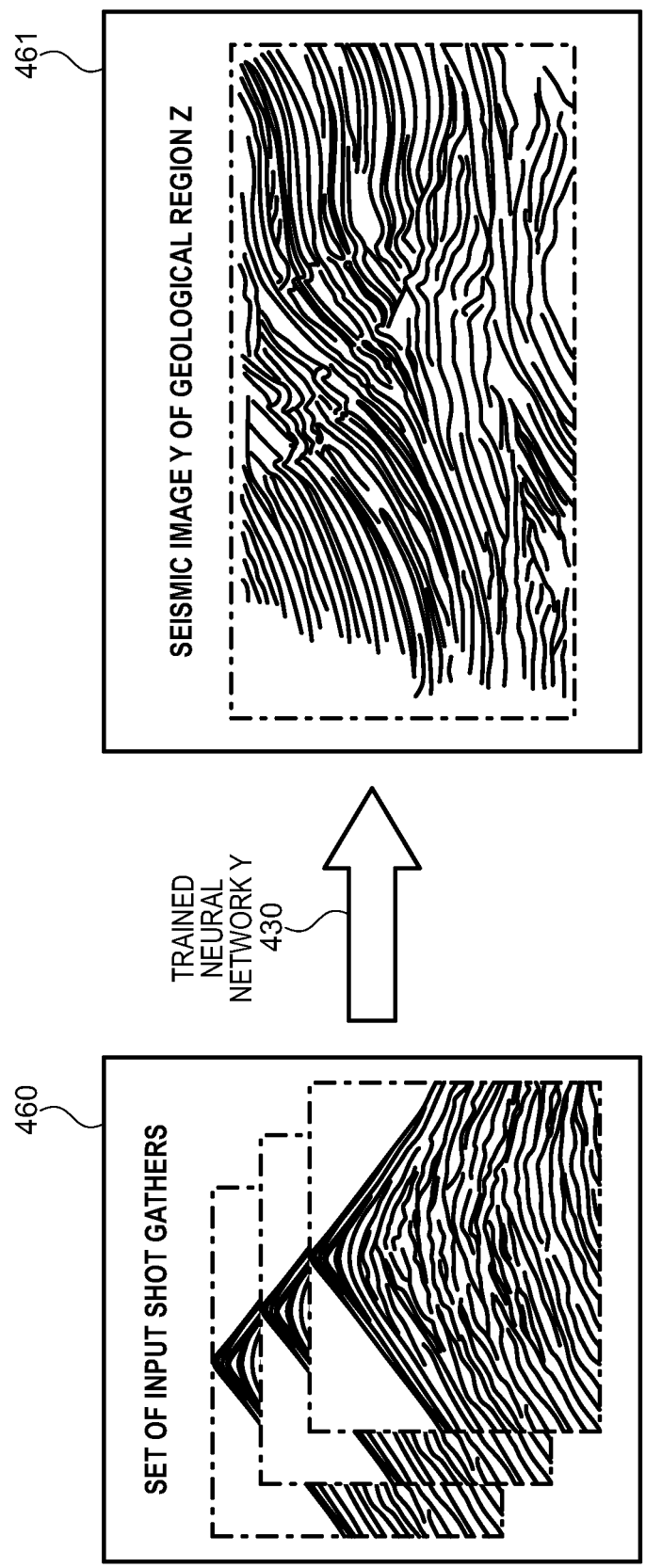

Turning to FIGS. 4A, 4B, and 4C, FIGS. 4A, 4B, and 4C provide examples of training and using a model to predict migrated seismic data from pre-processed seismic data. The following example is for explanatory purposes only and not intended to limit the scope of the disclosed technology.

In FIG. 4A, a seismic interpreter (not shown) obtains seismic data D (410) for a seismic survey M, where the seismic data D (410) includes various pre-processed shot gathers (i.e., pre-processed shot gathers A (411), pre-processed shot gathers B (412), pre-processed shot gathers C (413)). After obtaining a seismic volume from the seismic survey M, the seismic interpreter may process raw seismic data to produce various shot gathers corresponding to source distances and time values within the seismic survey M. Using a reverse time migration (for example, other migration operators are also allowed) function (405) and a velocity model A (415), the pre-processed shot gathers A (411) in seismic data D (412) are used to generate various training shot gathers A (420). The seismic interpreter then performs a training operation function (425) that uses the training shot gathers A (420) as a training dataset for training a neural network X (421). The neural network X could have been pre-trained on another seismic data. The output of this training operation is a trained neural network Y (430) that approximates a migration operator using a neural network. Thus, the pre-processed shot gathers (412, 413) from seismic data D (410) are input to a trained neural network Y (430) to generate migrated seismic shot gathers (435) for the seismic survey M.

Turning to FIG. 4B, a migrated shot gather Y (451) is obtained from an input shot gather X (450) using a trained neural network Y (430). After training, the trained neural network Y (430) may now provide a general approximation for generating migrated image data from time-based shot gather data. For a velocity model different from velocity model A (415), the trained neural network Y (430) may require retraining to approximate the new velocity model. Turning to FIG. 4C, the trained neural network Y (430) generates a seismic image Y (461) of a geological region Z using a set of predicted shot gather migrations (460). Thus, the migrated image Y (461) may be a stack image generated from multiple predicted shot gather migrations (460) using the trained neural network Y (430) and any previously migrated shot gathers (not shown in FIG. 4C).

Figure 5A:
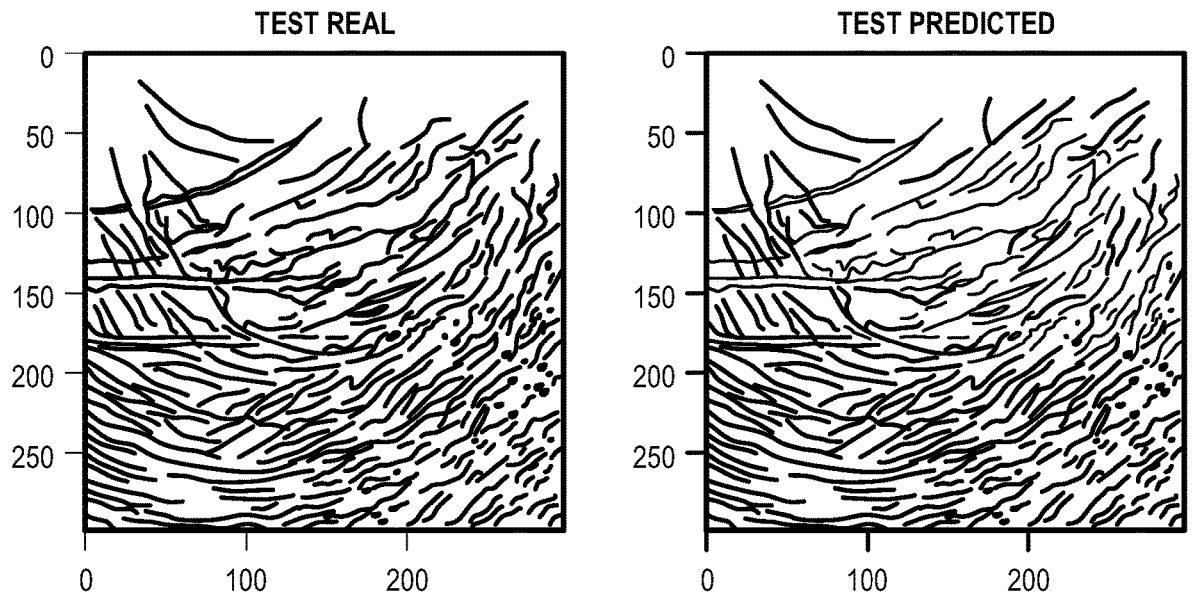
Figure 5B:
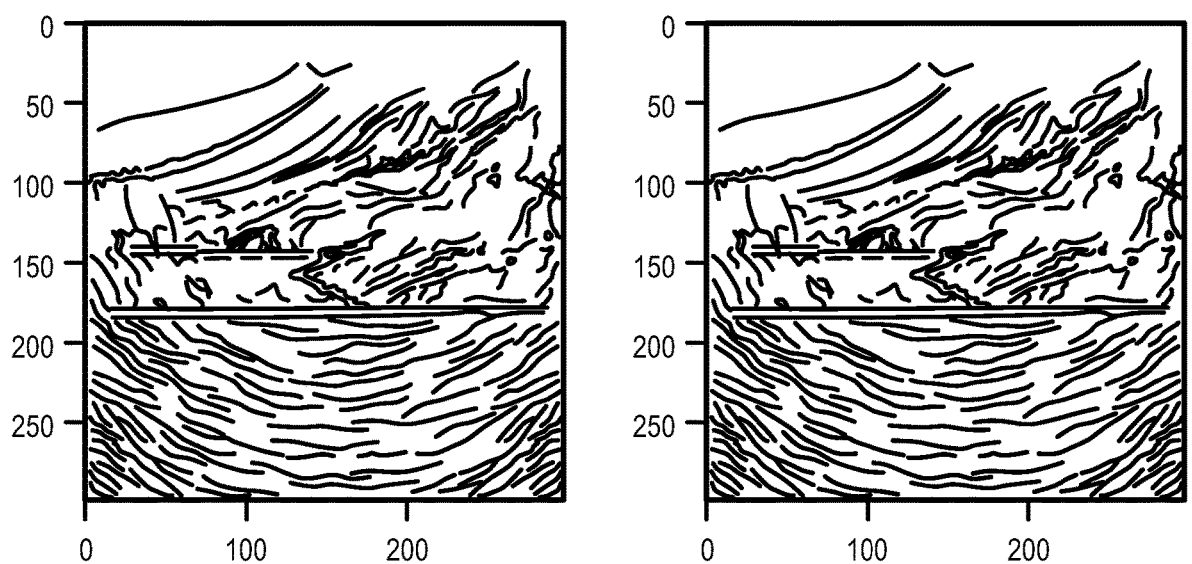

Turning to FIGS. 5A and 5B, FIGS. 5A and 5B illustrate an experimental example in accordance with one or more embodiments. The following example is for explanatory purposes only and not intended to limit the scope of the disclosed technology.

In FIG. 5A, an actual migrated image is shown on the left that was obtained using a migration algorithm, while a predicted migrated image is shown on the right that was obtained using a trained neural network. In FIG. 5B, a comparison is shown with a final migrated stacked image on the left that includes a composition of 25% actual shot migrations using a migration algorithm and 75% predicted shot migrations using a trained neural network. The decimation factor for this example is 4. In this experimental example, the input and output of a trained neural network is 300×300 grid points. Based on an estimated grid point performance per second, the migration performance is about 500 million grid points/s in two dimensions (2D) that uses an 8th order finite difference stencil. As such, the velocity and output image size for this experiment is 500×500 pixels (i.e., 300×300 plus 100 points for absorbing boundaries on each side of the domain) and 10 meters between grid points. The maximum travel time in the seismic data is 6.6 seconds, so the number of time steps is 15,000 for the forward wavefield (FW) and 15,000 time steps for the backward propagation pass (BW), which results in a total 30,000 time steps for migration of a single shot. This migration algorithm may require 2 minutes per shot to generate migrated data. Therefore, migrating 400 shots with a specific computer system may require 800 minutes of computational time (i.e., 13 hours 20 minutes). To migrate 200 shots, the computer system may require 400 minutes of computational time (i.e., 6 hours 40 minutes). Where the specific computer system includes a graphical processing unit (GPU), the amount of time to perform migration may be an order of magnitude less (e.g., 80 minutes for migrating 400 shots and 40 minutes for migrating 200 shots).

In contrast to using a migration algorithm for all shots in this experimental example, this specific computer system may obtain the experiment's seismic data and pre-process the data (i.e., downscale a shot gather image with dimensions of 1500×1500 to dimensions of 300×300) in 8 minutes. To train a neural network on 190 shot gathers (i.e., 200 shot gathers for the training operation and 10 shot gathers for validation and testing) may require 20 minutes. To evaluate the trained neural network on 200 shot gathers may take 5 seconds. Likewise, to initialize the neural network into the specific computer system (e.g., to load a pre-trained neural network to apply transfer learning) may take 2 seconds. Therefore, by using a pre-trained model, the loading and evaluation is under 10 seconds which may outperform various migration algorithms performed on a computer processing unit (CPU) (e.g., 6 hours 40 minutes) or on a graphical processing unit (GPU) (e.g., 40 minutes).

Computer System

Figure 6:
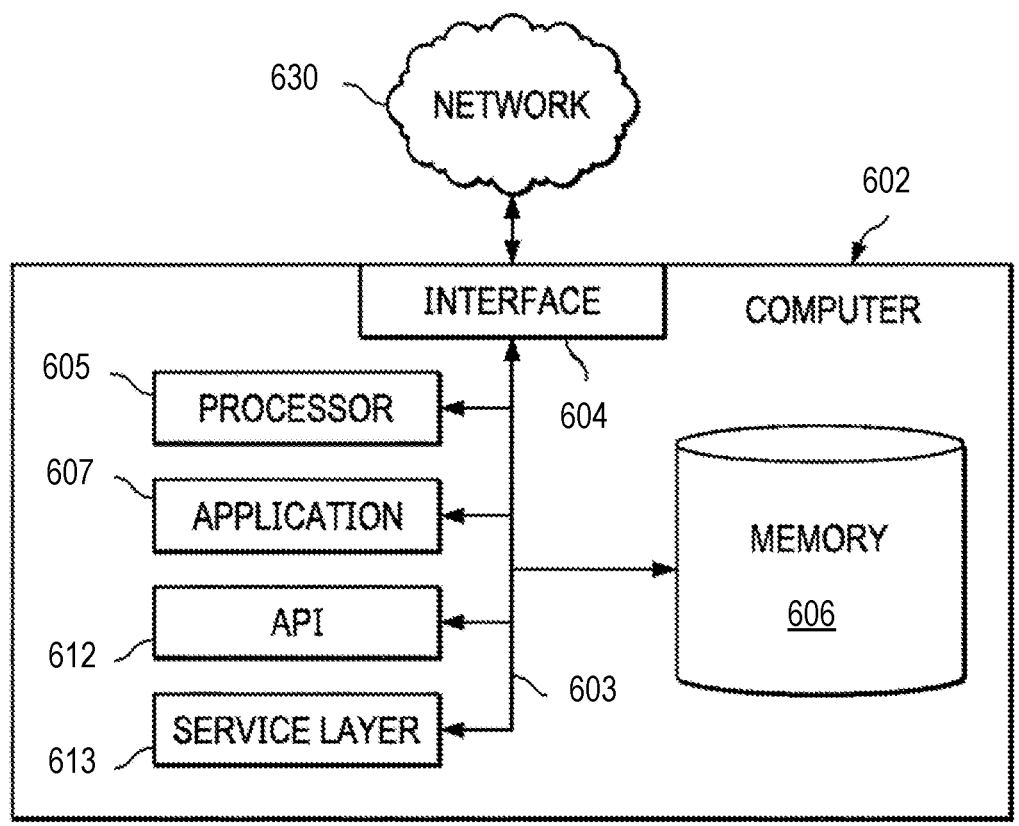
FIG. 6 shows a computing system in accordance with one or more embodiments.

Embodiments may be implemented on a computer system. FIG. 6 is a block diagram of a computer system used to provide computational functionalities associated with described algorithms, methods, functions, processes, flows, and procedures as described in the instant disclosure, according to an implementation. The illustrated computer (602) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630) or cloud. In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) or cloud from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604 includes logic encoded in software or hardware (or a combination of software and hardware) and operable to communicate with the network (630) or cloud. More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

In some embodiments, the computer (602) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), artificial intelligence as a service (AIaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
   acquiring, using a seismic surveying system, first seismic data regarding a first geological region of interest, wherein the seismic surveying system comprises a plurality of seismic receivers and a plurality of seismic sources,
   wherein the plurality of seismic sources comprise a seismic vibrator configured to perform a vibroseis technique,
   wherein at least one of the plurality of seismic receivers is a multi-component sensor that measures pressure waves in a plurality of spatial axes, and
   wherein the plurality of seismic receivers comprises an accelerometer and a geophone;
   determining, by a computer processor, a plurality of pre-processed gathers in a time domain using the first seismic data and seismic data processing operation, wherein the seismic data processing operation comprises a removal one or more surface waves from the first seismic data;
   forward modeling, by the computer processor, a first seismic wavefield using a portion of the plurality of pre-processed gathers, a synthetic seismic source wavelet, and a first velocity model;
   backward propagating, by the computer processor, a second seismic wavefield using the portion of the plurality of pre-processed gathers and the first velocity model;
   determining, by the computer processor, one or more cross-correlation values between the first seismic wavefield and the second seismic wavefield;
   generating, by the computer processor, a plurality of migrated gathers using the portion of the plurality of pre-processed gathers, a predetermined imaging condition, and the one or more cross-correlation values;
   acquiring, using the seismic surveying system, legacy seismic data regarding a second geological region of interest that is different from the first geological region of interest;
   training, by the computer processor, an initial model to produce a pre-trained machine-learning model using a first training operation and a training dataset comprising the legacy seismic data, wherein the pre-trained machine-learning model is trained to predict migrated seismic data, wherein the first training operation is performed based on a first machine-learning algorithm and a plurality of machine-learning epochs;
   selecting, by the computer processor, a plurality of training gathers based on plurality of migrated gathers;
   training, by the computer processor, the pre-trained machine-learning model to produce a trained model using a second training operation,
   wherein the second training operation is performed using the plurality of training gathers, the pre-trained machine-learning model, and a second machine-learning algorithm;
   generating, by the computer processor, predicted migrated seismic data in a depth domain using the trained model and a plurality of non-selected pre-processed gathers among the plurality of pre-processed gathers;
   generating, by the computer processor, a seismic image of the first geological region of interest using the predicted migrated seismic data; and
   determining, by the computer processor, a presence of one or more hydrocarbon deposits in the first geological region of interest using the seismic image.

2. The method of claim 1,
   wherein at least one training gather among the plurality of training gathers comprises an input gather and an output gather,
   wherein the input gather corresponds to a seismic gather in a time domain, and
   wherein the output gather corresponds to a migrated gather in a depth domain.

3. The method of claim 1,
   wherein at least one seismic gather of the plurality of pre-processed gathers is a shot gather that has one dimension based a source offset during a seismic survey and a second dimension based on a time value during the seismic survey, and
   wherein the at least one seismic gather is filtered to remove multiple reflections.

4. The method of claim 1,
   wherein the pre-trained machine-learning model is a convolutional neural network comprising at least one hidden layer, at least one activation function, a plurality of weights, and a plurality of biases, and
   wherein the pre-trained machine-learning model corresponds a second velocity model that is different from the first velocity model.

5. The method of claim 1, further comprising:
   determining, using the pre-trained machine-learning model, predicted migrated seismic data based on input seismic data, wherein the input seismic data corresponds to a portion of the first seismic data regarding the first geological region of interest;
   determining error data based on a mismatch between the predicted migrated seismic data and a portion of the plurality of training gathers; and
   updating the pre-trained machine-learning model using the error data and the second machine-learning algorithm,
   wherein the second machine-learning algorithm is a backward propagation algorithm.

6. The method of claim 1, further comprising:
determining, using the computer processor, a presence of hydrocarbons in the first geological region of interest using the seismic image.

7. The method of claim 1, further comprising:
generating the first velocity model using the first seismic data and a seismic inversion operation.

8. The method of claim 1,
wherein the seismic image is a stacked image comprising a plurality of actual migrated gathers and a plurality of predicted migrated gathers.

9. A system, comprising:
a seismic surveying system comprising a seismic source and a plurality of seismic receivers, wherein the seismic surveying system acquires first seismic data regarding a first geological region of interest,
wherein the seismic source is a seismic vibrator configured to perform a vibroseis technique,
wherein at least one of the plurality of seismic receivers is a multi-component sensor that measures pressure waves in a plurality of spatial axes,
wherein the plurality of seismic receivers comprises an accelerometer and a geophone, and
wherein the seismic surveying system further acquires legacy seismic data regarding a second geological region of interest that is different from the first geological region of interest; and
a seismic interpreter comprising a computer processor, wherein the seismic interpreter is coupled to the seismic surveying system, the seismic interpreter is configured to perform a method comprising:
obtaining, using the seismic surveying system, the first seismic data regarding the first geological region of interest and the legacy seismic data regarding the second geological region of interest;
determining a plurality of pre-processed gathers in a time domain using the first seismic data and seismic data processing operation, wherein the seismic data processing operation comprises a removal of one or more surface waves from the first seismic data;
forward modeling a first seismic wavefield using a portion of the plurality of pre-processed gathers, a synthetic seismic source wavelet, and a first velocity model;
backward propagating a second seismic wavefield using the portion of the plurality of pre-processed gathers and the first velocity model;
determining one or more cross-correlation values between the first seismic wavefield and the second seismic wavefield;
generating a plurality of migrated gathers using the portion of the plurality of pre-processed gathers, a predetermined imaging condition, and the one or more cross-correlation values;
training an initial model to produce a pre-trained machine-learning model using a first training operation and a training dataset, wherein the training dataset comprises the legacy seismic data, and wherein the first training operation is performed based on a first machine-learning algorithm and a plurality of machine-learning epochs, and wherein the pre-trained machine-learning model is trained to predict migrated seismic data;
selecting a plurality of training gathers based on the plurality of migrated gathers;
training the pre-trained machine-learning model to produce a trained model using a second training operation, wherein the second training operation is performed using the plurality of training gathers, the pre-trained machine-learning model, and a second machine-learning algorithm;
generating predicted migrated seismic data in a depth domain using the trained model and a plurality of non-selected pre-processed gathers among the plurality of pre-processed gathers;
generating a seismic image of the first geological region of interest using the predicted migrated seismic data; and
determining a presence of one or more hydrocarbon deposits in the first geological region of interest using the seismic image.

* * * * *